May 30, 1939.  K. G. COUTLÉE  2,160,646
ELECTRIC CONDENSER
Filed Sept. 2, 1936

INVENTOR
K.G. COUTLEE
BY
ATTORNEY

Patented May 30, 1939

2,160,646

UNITED STATES PATENT OFFICE 2,160,646

ELECTRIC CONDENSER

Kenneth G. Coutlée, Yonkers, N. Y., assignor to Bell Telephone Laboratories, Incorporated, New York, N. Y., a corporation of New York Application September 2, 1936, Serial No. 99,020

1 Claim. (Cl. 175—41)

This invention relates to electric condensers and more particularly to an improved electrical condenser which is substantially moisture-proof and to a method of manufacturing a substantially moisture-proof condenser.

An object of this invention is to manufacture economically a moisture-proof condenser which is insulated from the apparatus to which it is affixed and is of good appearance.

A more particular object of this invention is to protect the housing and support the leads of an electric condenser with a common dielectric material.

Ordinarily the leads of a condenser unit are subjected to considerable handling in use. For this reason the leads of a condenser are preferably reinforced. In many uses, too, a condenser housing which is insulated from the apparatus to which it is attached is also desired.

In accordance with this invention, a condenser unit having leads electrically connected thereto is completely surrounded by a dielectric material which coalesces with a support for the leads whereby a substantially moisture-proof container is provided for the condenser. For example, if a housing is employed, the condenser unit is inserted in the housing which is open at one end. Leads of the condenser unit pass through the open end of the housing. After a sealing compound has been placed into the top of the housing, the housing is covered with a material comprising a dielectric such as cellulose acetate. This material in addition to other functions reinforces the leads and affords a substantially moisture-proof covering for open end of the housing through which the leads pass. Preferably tabs are provided when two or more units are contained within the housing to insulate and separate the leads of one unit from those of another unit. The housing containing the unit is then dipped in or sprayed with a solution of a dielectric, such as cellulose acetate in acetone, having a viscosity which insures the formation of a protective coating of a desired thickness on the housing. The solvent of the protective coating dielectric also dissolves or softens the dielectric covering. Preferably the material comprising the covering is the same as the protective coating dielectric. The covering is softened sufficiently as a result of the dipping or spraying operation to form one integral covering over the entire condenser whereby moisture is substantially prevented from entering the condenser units.

A more comprehensive understanding of this invention is obtained by reference to the accompanying drawing in which.

Figure 1:
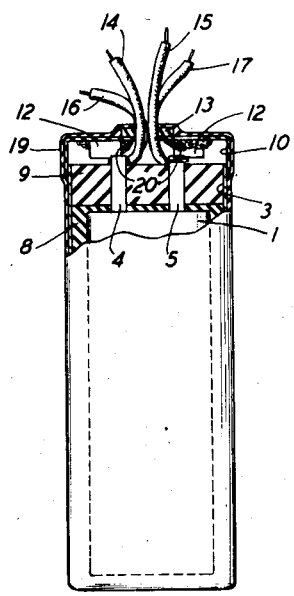
Fig. 1 is a front elevation, partly broken away, of a preferred embodiment of this invention.
Figure 2:
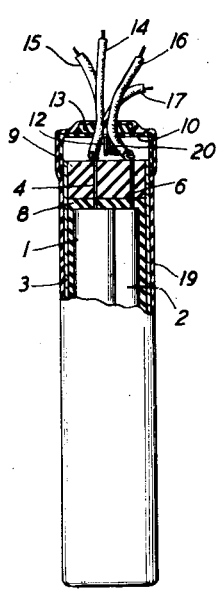
Fig. 2 is a side elevation, partly broken away, of the embodiment shown in Fig. 1.

In the embodiment of this invention shown in Figs. 1, 2, 3 and 4, two condenser units 1 and 2 are inserted in a collapsible metal tube 3. The condenser units 1 and 2 are formed by rolling together compactly alternate strips of conducting foil, such as aluminum foil and a dielectric, such as paper. Suitable flexible leads 4 and 5 are connected to the alternate layers of conducting foil of condenser 1, while two conducting leads 6 and 7 are connected to the alternate conducting layers of condenser 2. Casing 3 is constructed of thin lead of a collapsible nature. The casing may be oval or round in form before being pressed into the desired shape. If the condenser units 1 and 2 are inserted in the casing 3 and the casing with the units therein pressed to the desired shape, the units may be impregnated with a wax 8, such as chlorinated naphthalenes. The portion of the terminals protruding above the wax 8 is covered with a petrolatum sealing compound 9 which acts as a moisture-proof seal for the units 1 and 2 and fills the upper portion of the housing 3 above the impregnating compound 8. The terminal strips 4, 5, 6 and 7 are connected respectively to flexible leads 14, 15, 16 and 17 by means of solder. The flexible tube condenser heretofore described is preferably constructed in accordance with the method disclosed in detail in the copending application of F. J. Given Serial No. 93,183, filed July 29, 1936.

After the unit is impregnated and sealed, any of the impregnating compound 8 and sealing compound 9 adhering to the surface of the housing 3 is preferably removed by cleaning with a solvent. A cap 10 of an insulating material, such as cellulose acetate, is then placed over the pliable metallic container 3. The cap 10 is provided with a hole 11 through which the leads 14, 15, 16 and 17 pass and two tabs 12 are formed by bending a portion of cap 10 to a position which is perpendicular to the top thereof. The tabs 12 are located on the cap 10 so that when the cap 10 is placed over the casing 3 one of the tabs separates the terminal strips 4 and 6, while the other separates the terminal strips 5 and 7. The cap 10 which is preferably of the order of 15 mils in thickness is constructed to fit over the open end of the casing 3. The leads 14, 15, 16 and 17 are inserted through the opening of a cellulose acetate washer 13. The washer 13 is then placed in contact with the cover 10.

Figure 4:
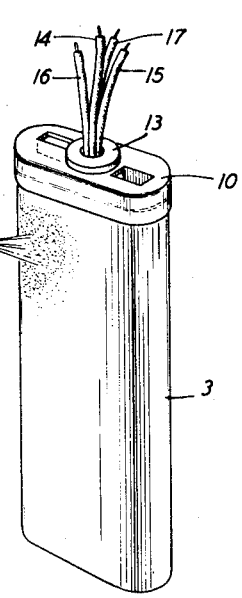
Fig. 4 shows the manner of applying a protective coating by means of a spray gun to the condenser shown in Fig. 1.
Figure 3:
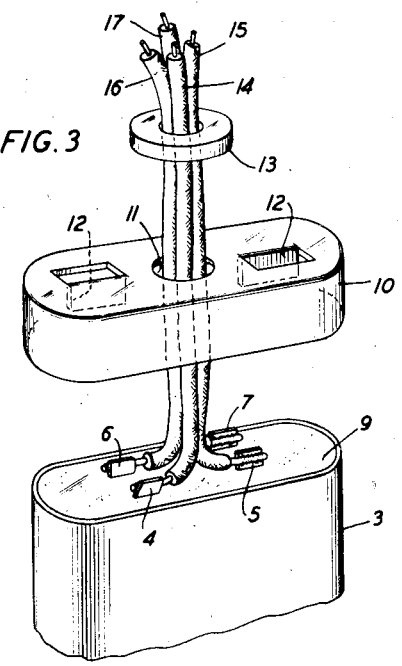
Fig. 3 is an exploded view of the top of the embodiment shown in Fig. 1.

The condenser casing 3 with the cap and washer in position is then dipped in or sprayed with a solution of a dielectric material such as cellulose acetate lacquer which, if desired, may contain pigments. The solvent for the cellulose acetate may be acetone having suitable quantities of a retarder such as ethyl lactate, butyl lactate or diacetone alcohol. The viscosity of the solution is such as to insure a sufficient thickness of the protective coating of cellulose acetate on the container. The period of dipping or spraying is sufficient to cement thoroughly the washer 13 to the cap 10 and the cap 10 to the container 3. The manner of applying the solution of cellulose acetate by means of spraying is indicated in Fig. 4. A spray gun 18 emitting the solution of cellulose acetate is directed over the entire condenser including container 3, cap 10 and washer 13 to produce a protective coating 19 over the entire outside of the condenser. In addition, the dipping or spraying with cellulose acetate results in the formation of two lugs 20 of this material which further serve to insulate the terminal strips 4 and 6 and 5 and 7 from each other. Preferably, the flexible leads 14, 15, 16 and 17 are insulated by means of textiles which have been impregnated in a solution of cellulose acetate. If the condenser is dipped in the cellulose acetate lacquer it is inserted in a tank containing the lacquer to about ⅛" above the top of the cellulose acetate washer 13. The condenser is then slowly withdrawn from the tank at a uniform and slow rate to prevent the formation of bubbles and to obtain as smooth and uniform a surface as possible. After dipping, the condenser is dried at a temperature of not more than 110° F. in an atmosphere of air having a relative humidity low enough to prevent condensation of moisture on the surface of the lacquer.

Figure 5:
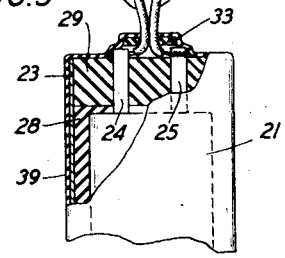
Figs. 5 and 6 show respectively a front and side elevation, partly broken away, of another embodiment of this invention.
Figure 6:
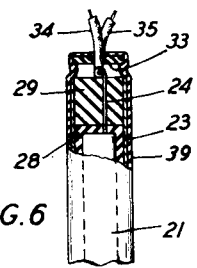

Figs. 5 and 6 illustrate another modification of this invention in which the cap member as previously described is dispensed with. A single condenser unit 21 consisting of alternate layers of conducting material such as aluminum foil separated by paper or other insulation is encased in a pliable metallic container 23. Flexible terminals 24 and 25 are connected to the alternate layers. These terminals 24 and 25, in turn, are connected respectively to flexible leads 34 and 35. This condenser is impregnated with chlorinated naphthalenes or other impregnating wax 28 and the upper portion of the container 23 is filled with a sealing compound 29. The flexible leads 34 and 35 pass through a cellulose acetate washer 33. The condenser is dipped or sprayed to form a protective coating 39 in a manner similar to that described for the condenser shown in Figs. 1 to 4.

While the described embodiments of this invention are the foil type of condenser, the construction and method are equally applicable to stock condensers such as mica and foil condensers. Although the cap 10 and the washer 13 of the condenser illustrated in Figs. 1 to 4 and the washer 33 of the condenser shown in Figs. 5 and 6 are cellulose acetate and the solution employed to form the protective coating for both condensers is cellulose acetate dissolved in acetone, any other dielectric material may be employed as the cap and washer of the condenser and the protective coating may comprise a similar or different dielectric material. For example, the cap 10 and washer 13 of the condenser shown in Figs. 1 to 4 may comprise cellulose nitrate and a cellulose nitrate lacquer may be employed for the protective coating 19. In the practice of covering the condenser, however, a solvent is employed which dissolves or softens the cover and washer to form a complete and substantially moisture-proof and insulating covering for the entire condenser. Although a housing is employed for the condensers heretofore described, this invention also contemplates the support of the leads and the covering of the unit with the dielectric material for moisture-proofing the condenser without any container other than that formed by the dielectric material.

While preferred embodiments of this invention have been illustrated and described, various modifications therein may be made without departing from the scope of the appended claim.

What is claimed is:

A condenser comprising a condenser unit, leads for electrically connecting said unit to electrical apparatus, a collapsible tube housing for containing said unit, said housing having an opening at one end a cellulose acetate cover for the open end of said unit, tabs on said cover for insulating said leads from each other, a cellulose acetate washer fixedly attached to said cover through which said leads pass and a thin film of cellulose acetate completely covering said housing, washer and cover.

KENNETH G. COUTLÉE.